US011594725B1

(12) United States Patent
Han et al.

(10) Patent No.: US 11,594,725 B1
(45) Date of Patent: Feb. 28, 2023

(54) SOLID STATE PRETREATMENT OF ACTIVE MATERIALS FOR NEGATIVE ELECTRODES IN ELECTROCHEMICAL CELLS

(71) Applicant: GRU Energy Lab Inc., San Jose, CA (US)

(72) Inventors: Song Han, Foster City, CA (US); Sa Zhou, San Jose, CA (US)

(73) Assignee: GRU Energy Lab Inc., San Jose, CA (US)

(*) Notice: Subject to any disclaimer, the term of this patent is extended or adjusted under 35 U.S.C. 154(b) by 176 days.

(21) Appl. No.: 17/111,047

(22) Filed: Dec. 3, 2020

Related U.S. Application Data

(60) Provisional application No. 62/943,136, filed on Dec. 3, 2019.

(51) Int. Cl.
*H01M 4/131* (2010.01)
*H01M 4/38* (2006.01)
(Continued)

(52) U.S. Cl.
CPC ......... *H01M 4/386* (2013.01); *H01M 4/0471* (2013.01); *H01M 4/131* (2013.01);
(Continued)

(58) Field of Classification Search
CPC .... H01M 4/386; H01M 4/0471; H01M 4/131; H01M 4/134; H01M 4/364; H01M 10/0525; H01M 2004/027
See application file for complete search history.

(56) References Cited

U.S. PATENT DOCUMENTS 5,395,711 A * 3/1995 Tahara ................. H01M 10/05
429/231.95
2015/0221950 A1* 8/2015 Minami ............ H01M 10/0525
429/223

FOREIGN PATENT DOCUMENTS

CN 102086032 A * 6/2011
CN 108269979 A * 7/2018 .............. H01M 4/36

OTHER PUBLICATIONS

Machine Translation CN102086032A (Year: 2011).*
(Continued)

*Primary Examiner* — Victoria H Lynch
(74) *Attorney, Agent, or Firm* — Polygon IP, LLP

(57) ABSTRACT

Provided are methods for solid state pretreatment of active materials (e.g., prelithiation of silicon monoxide) while forming treated negative active material structures. Also provided are the formed structures, negative electrodes comprising these structures, and electrochemical cells comprising these electrodes. In some examples, silicon monoxide structures are mixed with lithium hydroxide structures or some other lithium-containing structures. The mixture is heated in an inert environment to form treated negative active material structures. These treated structures comprise various lithium-containing components, some of which trap lithium. When an electrochemical cell, formed with these treated negative active material structures, is initially charged and additional new lithium ions are introduced into the negative electrodes (e.g., from the positive electrode), a larger portion of these new lithium ions forms reversible components (rather than irreversible components) in the negative electrode than, for example, in a conventional cell without any such treatment.

20 Claims, 5 Drawing Sheets

(51) Int. Cl.
  *H01M 4/36*      (2006.01)
  *H01M 4/134*     (2010.01)
  *H01M 4/04*      (2006.01)
  *H01M 10/0525*   (2010.01)
  *H01M 4/02*      (2006.01)

(52) U.S. Cl.
  CPC ........... *H01M 4/134* (2013.01); *H01M 4/364* (2013.01); *H01M 10/0525* (2013.01); *H01M 2004/027* (2013.01)

(56) References Cited

OTHER PUBLICATIONS

Machine Translation CN108269979A (Year: 2018).*
Li, Yangxing et al., Effective enhancement of lithium-ion battery performance using SLMP, Electrochemistry Communications 13 (2011), pp. 664-667.
Liu, Nian et al., Prelithiated Silicon Nanowires as an Anode for Lithium Ion Batteries, ACS Nano, 2011, 5 (8), pp. 6487-6493.
Sun, Yongming et al., High-capacity battery cathode prelithiation to oset initial lithium loss, Nature Energy, vol. 1(2016), 15008, 7 pgs.
Zhao, Jie et al., Metallurgically lithiated SiOx anode with high capacity and ambient air compatibility, PNAS vol. 113, No. 27 (2016), pp. 7408-7413.

\* cited by examiner

Sold State
Pretreatment

SOLID STATE PRETREATMENT OF ACTIVE MATERIALS FOR NEGATIVE ELECTRODES IN ELECTROCHEMICAL CELLS

CROSS-REFERENCE TO RELATED APPLICATIONS

This application claims the benefit under 35 U.S.C. § 119(e) of U.S. Provisional Patent Application No. 62/943,136, filed on 2019 Dec. 3, which is incorporated herein by reference in its entirety for all purposes.

TECHNICAL FIELD

The present disclosure relates generally to electrochemical cells comprising negative active materials formed by solid state pretreatment of active materials (e.g., pre-lithiated silicon monoxide) and methods of fabricating thereof.

BACKGROUND

High-capacity rechargeable batteries with long cycle lives are highly desirable for various applications. However, many types of active materials, especially high capacity active materials, suffer from poor cycle life and, in particular, poor first-cycle Coulombic efficiency (CE). This issue has been attributed to various undesirable reactions, which irreversibly trap active materials and/or ions, used to carry the electrical charge between negative and positive electrodes. Once the active materials and/or ions are irreversibly trapped, they are no longer available for supporting the charge transfer. These trapped materials effectively become the "deadweight" and "dead volume" in the cells, negatively impacting both gravimetric and volumetric capacities. The cycling is provided by the remaining active materials and/or ions and is often substantially lower than the initial capacity or the theoretical capacity.

Various approaches have been proposed in the past to mitigate the negative effects of these undesirable reactions. For example, adding lithium metal in contact with or mixed into negative electrodes has been proposed. However, the uniform distribution of lithium metal on the electrode surface or within the electrode volume is difficult to achieve. Furthermore, special processing environments are needed for handling lithium metal. These environments (e.g., with low humidity and/or oxygen) are often not practical on the production scale. Other approaches involve forming lithium metal layers on the surface of negative electrodes by thermal evaporation or expose a negative electrode to molten lithium. However, these approaches are also hardly scalable or practical for manufacturing. Yet another approach involves adding prelithiation reagents, such as LiF/Co, to positive electrodes to compensate for future losses of lithium ions. However, these reagents are difficult to synthesize and produce a significant volume of inoperable byproducts after releasing lithium ions. Overall, no practical solutions for industrial manufacturing-scale prelithiation are currently available.

What is needed are new methods and negative active material structures preventing irreversible trapping of lithium ions, such as solid state pretreatment of active materials.

SUMMARY

Provided are methods for solid state pretreatment of active materials (e.g., prelithiation of silicon monoxide) while forming treated negative active material structures. Also provided are the formed structures, negative electrodes comprising these structures, and electrochemical cells comprising these electrodes. In some examples, silicon monoxide structures are mixed with lithium hydroxide structures or some other lithium-containing structures. The mixture is heated in an inert environment to form treated negative active material structures. These treated structures comprise various lithium-containing components, some of which trap lithium. When an electrochemical cell, formed with these treated negative active material structures, is initially charged and additional new lithium ions are introduced into the negative electrodes (e.g., from the positive electrode), a larger portion of these new lithium ions forms reversible components (rather than irreversible components) in the negative electrode than, for example, in a conventional cell without any such treatment.

In some examples, a method of solid state pretreatment of active material structures to form treated negative active material structures for negative electrodes in electrochemical cells comprises combining the active material structures and treatment material structures in a mixer. The active material structures comprise at least one of silicon monoxide, silicon, tin, or germanium. The treatment material structures comprise a metal hydroxide or a metal oxide. The method further comprises mixing the active material structures and the treatment material structures using the mixer thereby forming a mixture and ensuring uniform distribution of the active material structures and the treatment material structures in the mixture. The method also comprises heating the mixture of the active material structures and the treatment material structures thereby forming the treated negative active material structures. The treated negative active material structures comprising one or more electrochemically active materials and one or more electrochemically inactive materials.

In some examples, the one or more electrochemically active materials and the one or more electrochemically inactive materials comprise one or more of $Li_6Si_2O_7$, $Li_2Si_2O_5$, $Li_2SiO_3$, $Li_4SiO_4$, Si, and $SiO_2$. For example, one or more electrochemically inactive materials comprise one or more of $Li_6Si_2O_7$ and $Li_4SiO_4$. In the same or another example, the one or more electrochemically active materials comprise $Li_2Si_2O_5$, Si, and $SiO_2$.

In some examples, the active material structures comprise silicon monoxide, represented by $SiO_X$ such that X is between 0.8 and 1.2 or, more specifically, between 0.9 and 1.0. The metal hydroxide or the metal oxide of the treatment material structures may comprise lithium. In some examples, the metal hydroxide or the metal oxide of the treatment material structures comprises one of lithium hydroxide (LiOH), lithium oxide ($Li_2O$), or lithium peroxide ($Li_2O_2$). For example, the metal hydroxide or the metal oxide of the treatment material structures comprises lithium oxide ($LiO_X$) such that X is between 0.5 and 1.

In some examples, the mixture of the active material structures and the treatment material structures is heated to between 800° C. and 1000° C. In the same or other examples, the mixture of the active material structures and the treatment material structures is heated in an inert environment. For example, the mixture of the active material structures and the treatment material structures is heated in an environment comprising hydrogen gas. In some examples, heating of the mixture of the active material structures and the treatment material structures removes water generated by reacting the active material structures and the treatment material structures. In some examples, the method further comprises separating an unreacted portion of the treatment material structures from the prelithiated negative active material structures.

In some examples, a group of treatment material structures for use in a negative electrode of an electrochemical cell is provided. The group of treatment material structures comprises one or more electrochemically active materials, comprising lithium and silicon, and also comprises one or more electrochemically inactive materials, comprising lithium and silicon. In some examples, the one or more electrochemically active materials and the one or more electrochemically inactive materials comprise one or more of $Li_2Si_2O_5$, $Li_2SiO_3$, $Li_4SiO_4$, Si, and $SiO_2$.

In some examples, the group of treatment material structures has a first cycle Coulombic efficiency of at least 60%. In the same or other examples, the group of treatment material structures has a second cycle capacity of at least 900 mAh/g.

Also provided is a lithium-ion cell. In some examples, the lithium-ion cell comprises a positive electrode and a negative electrode, comprising one or more electrochemically active materials and one or more electrochemically inactive materials, each group of the materials comprising lithium and silicon. The lithium-ion cell further comprises an electrolyte providing ionic communication between the positive electrode and the negative electrode. In some examples, the one or more electrochemically active materials and the one or more electrochemically inactive materials comprise one or more of $Li_2Si_2O_5$, $Li_2SiO_3$, $Li_4SiO_4$, Si, and $SiO_2$.

DETAILED DESCRIPTION

Figure 1:
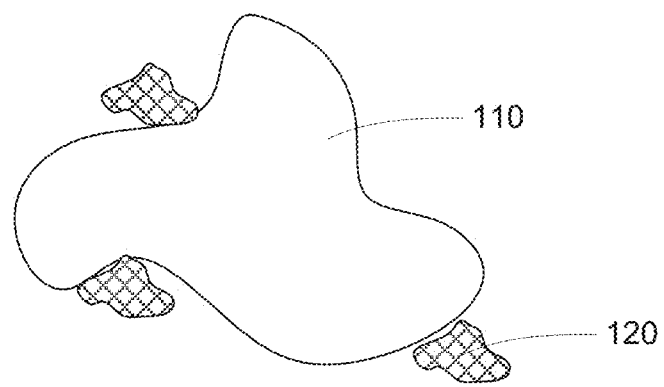
FIG. 1 is a schematic illustration of a combination of an active material structure and multiple treatment material structures, prior to solid state pretreatment, in accordance with some examples.

In the following description, numerous specific details are set forth in order to provide a thorough understanding of the present invention. The present invention may be practiced without some or all of these specific details. In other instances, well-known process operations have not been described in detail to avoid obscuring the present invention. While the invention will be described in conjunction with the specific examples, it will be understood that it is not intended to limit the invention to the examples.

Introduction

The energy storage capacity of a rechargeable lithium-ion electrochemical cell is determined at least in part by lithium ions, available for shuttling between positive and negative electrodes when the cell is being charged and discharged. Specifically, these lithium ions are initially provided as a part of the positive electrode. When the cell is charged, these ions are transferred to the negative electrode. When the cell is discharged, these ions are transferred back to the negative electrode. However, various undesirable reactions may occur during cycling, in particular during initial cycling. For example, the initial cycling typically causes the formation of a solid electrolyte interphase (SEI) layer. Overall, these undesirable reactions cause irreversible trapping of some lithium ions. Thereafter, these trapped ions are unavailable for further shuttling between the electrodes resulting in capacity loss. Often, this irreversible trapping of lithium ions is also referred to as lithium losses in a cell. Although, strictly speaking, the irreversibly trapped lithium ions are still present in the cell, these ions are "lost" for purposes of carrying the charge between the electrodes.

One promising negative active material for rechargeable lithium-ion electrochemical cells is silicon oxide or, more specifically, silicon monoxide, represented by stoichiometric formula $SiO_X$, in which the value of X is between 0.8 and 1.2 or, more specifically, between 0.9 and 1.1 on average. The value of X is average over the entire volume occupied by the negative active material and may vary (e.g., up to 10% or even up to 20%) between different clusters. Silicon monoxide has a high capacity of about 1200 mAh/g. For comparison, graphite's capacity is only 372 mAh/g. Furthermore, silicon monoxide has good cycling stability. For example, electrochemical cells, manufactured using a combination of silicon monoxide and graphite, have shown at least 80% capacity retention after 1000 cycles. However, the application of silicon oxide in rechargeable lithium-ion electrochemical cells has been limited so far due to the low first cycle efficiency of silicon oxide. As noted above, this low first cycle efficiency is attributed to lithium losses. For example, the first cycle efficiency of silicon monoxide is only about 50-60%, while the first cycle efficiency of graphite is 90-95%. For purposes of this disclosure, the first cycle efficiency, which may be also referred to as a first cycle Coulombic efficiency (CE), is defined as a portion of the first cycle capacity retained after the first cycle. Without being restricted to any particular theory, a mechanism of the initial capacity loss in silicon monoxide will now be described.

Specifically, transferring lithium ions to a silicon monoxide-based negative electrode (while charging the cell) causes the formation of the following compounds $Li_XSi$, $Li_2Si_2O_5$, $Li_6Si_2O_7$, and $Li_4SiO_4$, as reflected by the following formulas:

$$3SiO + {}^{114}/_{35}Li^+ + {}^{114}/_{35}e^- \rightarrow \tfrac{1}{2}Li_6Si_2O_7 + \tfrac{1}{5}Li_2Si_2O_5 + {}^{81}/_{35}Si \qquad \text{Formula 1}$$

$$SiO + Li^+ + e^- \rightarrow \tfrac{1}{4}Li_4SiO_4 + \tfrac{3}{4}Si \qquad \text{Formula 2}$$

$$Si + xLi^+ + xe^- \rightarrow Li_XSi \qquad \text{Formula 3}$$

Specifically, Formulas 1, 2, and 3 represent initial cell charging. $Li_6Si_2O_7$, which is a product in Formula 1, and $Li_4SiO_4$, which is a product in Formula 2, are not reversible products. In other words, once $Li_6Si_2O_7$ and $Li_4SiO_4$ are formed, these products will not decompose during the subsequent discharge and will not release lithium ions. These materials may be referred to as electrochemically inactive materials. The remaining products (e.g., $Li_xSi$ and $Li_2Si_2O_5$) are reversible and will decompose during the subsequent discharge, thereby releasing lithium ions as shown by Formulas 4 and 5:

$$Li_xSi \rightarrow Si + xLi^+ + xe^- \qquad \text{Formula 4}$$

$$Li_2Si_2O_5 + 3Si \rightarrow 5SiO + 2Li^+ + 2e^- \qquad \text{Formula 5}$$

In other words, these products (e.g., $Li_xSi$ and $Li_2Si_2O_5$) continue to participate in the further shuttling of lithium ions. Overall, a portion of silicon monoxide undergoing these reactions is irreversibly trapped in $Li_6Si_2O_7$ and $Li_4SiO_4$ and is not available for subsequent cycling. Similarly, a portion of lithium ions (e.g., initially supplied from a positive electrode) is irreversibly trapped in $Li_6Si_2O_7$ and $Li_4SiO_4$ and is not available for subsequent cycling. $Li_6Si_2O_7$ and $Li_4SiO_4$ may be referred to as electrochemically inactive materials. A portion of mono-silicon oxide initially converted into $Li_2Si_2O_5$ and $Li_xSi$ remains available for subsequent cycling and continues to contribute to the capacity of the electrochemical cell after the initial cell charging. These materials may be referred to as electrochemically active materials. The molar ratio of the electrochemically inactive materials (e.g., $Li_6Si_2O_7$ and $Li_4SiO_4$) to electrochemically active materials (e.g., $Li_2Si_2O_5$ and $Li_xSi$) determines the first cycle efficiency of silicon monoxide. As noted above, this first cycle efficiency is about 50-60% in some examples (e.g., for conventional silicon monoxide structures).

As such, methods and structures, described herein, are used to prevent lithium losses associated with initial cycling. These methods utilize solid state pretreatment and form treated negative active material structures. In comparison to untreated materials, treated negative active material structures greatly improve energy and cycle life of the resulting cells. The treated negative active material structures already include one or more electrochemically inactive materials. As such, lithium losses are reduced and possibly eliminated.

Figure 2:
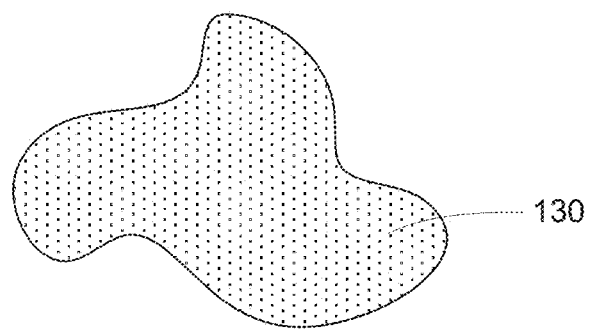
FIG. 2 is a schematic illustration of a treated negative active material structure, formed by the solid state treatment of active material structures with treatment material structures, in accordance with some examples.

Examples of Treated Negative Active Material Structures and Method of Fabricating Thereof FIG. 1 is a schematic illustration of a combination of active material structure 110 and multiple treatment material structures 120, prior to treatment, in accordance with some examples. In general, any number of structures of each type or even parts of these structures may participate in treatment. Some examples of weight ratios of active material structures 110 and treatment material structures 120 are described below. The treatment process form treated negative active material structure 130, which is schematically shown in FIG. 2. The composition of negative active material structure 130 may be uniform throughout the entire volume of the structure. Alternatively, negative active material structure 130 may have multiple clusters having different compositions. Various operations used to form treated negative active material structure 130 from active material structures 110 and treatment material structures 120 are described below with reference to FIG. 3.

In some examples, active material structures 110 comprises silicon oxide or, more specifically, silicon monoxide, e.g., represented by $SiO_x$, where X is between 0.8 and 1.2 or, more specifically, between 0.9 and 1.1. Other examples of suitable materials for active material structures 110 include, but are not limited to, silicon, tin, germanium, oxides thereof, sulfides thereof, and the like. Various combinations of these materials are also within the scope.

Active material structures 110 may be in the form of particles, rods, tubes, flakes, and the like. For purposes of this disclosure, a particle is defined as a structure, in which the ratio of any two dimensions is less than 10. A flake is defined as a structure, in which a ratio of each of two dimensions to the remaining one dimension is greater than 10. A rod or a tube is defined as a structure, in which a ratio of one dimension to each of the remaining two dimensions is greater than 10. In some examples, the mean principal dimension (e.g., the mean particle size) of active material structures 110 is between 0.1 micrometers and 20 micrometers or, more specifically, between 0.5 micrometers and 10 micrometers. While smaller particles may result in a more uniform composition of the resulting treated structures, the smaller size also translates into a larger surface area (per volume), which may undesirable for SEI formation and other reasons. For purposes of this disclosure, the principal dimension is the largest dimension of a structure, e.g., the length of a rod. It should be noted that these dimensions and compositions, described herein, apply to active material structures 110 prior to processing these structures and may change during solid statement pretreatment. Specifically, active material structures 110 are converted into treated negative active material structures 130, which are further described below.

In some examples, treatment material structures 120 comprise a metal hydroxide (MeOH) or a metal oxide (MeO). Some examples of the metal in either hydroxide or oxide include, but are not limited to, lithium, sodium, magnesium, and the like. Specific material examples of treatment material structures 120 include, but are not limited to, lithium hydroxide (LiOH) and lithium oxide ($LiO_x$), where X ranges from 0.5 to 1 or, more specifically, from 0.6 to 0.9. One example is lithium peroxide ($Li_2O_2$) which may be used by itself or combined with lithium oxide ($Li_2O$) at various ratios. Treatment material structures 120 may be in the form of particles, rods, tubes, flakes, and the like. The mean principal dimension of treatment material structures 120 is between 0.1 micrometers and 20 micrometers. It should be noted that these dimensions and compositions, described herein, apply to treatment material structures 120 before solid statement pretreatment. At least a portion of treatment material structures 120 is consumed during the solid statement pretreatment.

FIG. 2 is a schematic illustration of treated negative active material structure 130, formed by mixing active material structures 110 and treatment material structures 120 and processing the mixture (e.g., heating at specific conditions). In some examples, treated negative active material structures 130 comprise $Li_2Si_2O_5$, $Li_2SiO_3$, $Li_4SiO_4$, Si, and/or $SiO_2$. As noted above, $Li_4SiO_4$ is an electrochemically inactive material while $Li_2Si_2O_5$, $Li_2SiO_3$, Si, and $SiO_2$ are all electrochemically active. $Li_6Si_2O_7$, which is another electrochemically inactive material, may or may not form during this treatment process. Forming these electrochemically inactive materials during this solid state pretreatment prevents or at least reduces the subsequent formation of these materials during the initial cycling, thereby reducing the amount of lithium ions irreversibly trapped and need to be provided on a positive electrode.

Negative active material structure 130 may be in the form of particles, rods, tubes, flakes, and the like. The mean principal dimension of negative active material structures 130 is between 0.1 micrometers and 20 micrometers.

PROCESSING EXAMPLES

Figure 3:
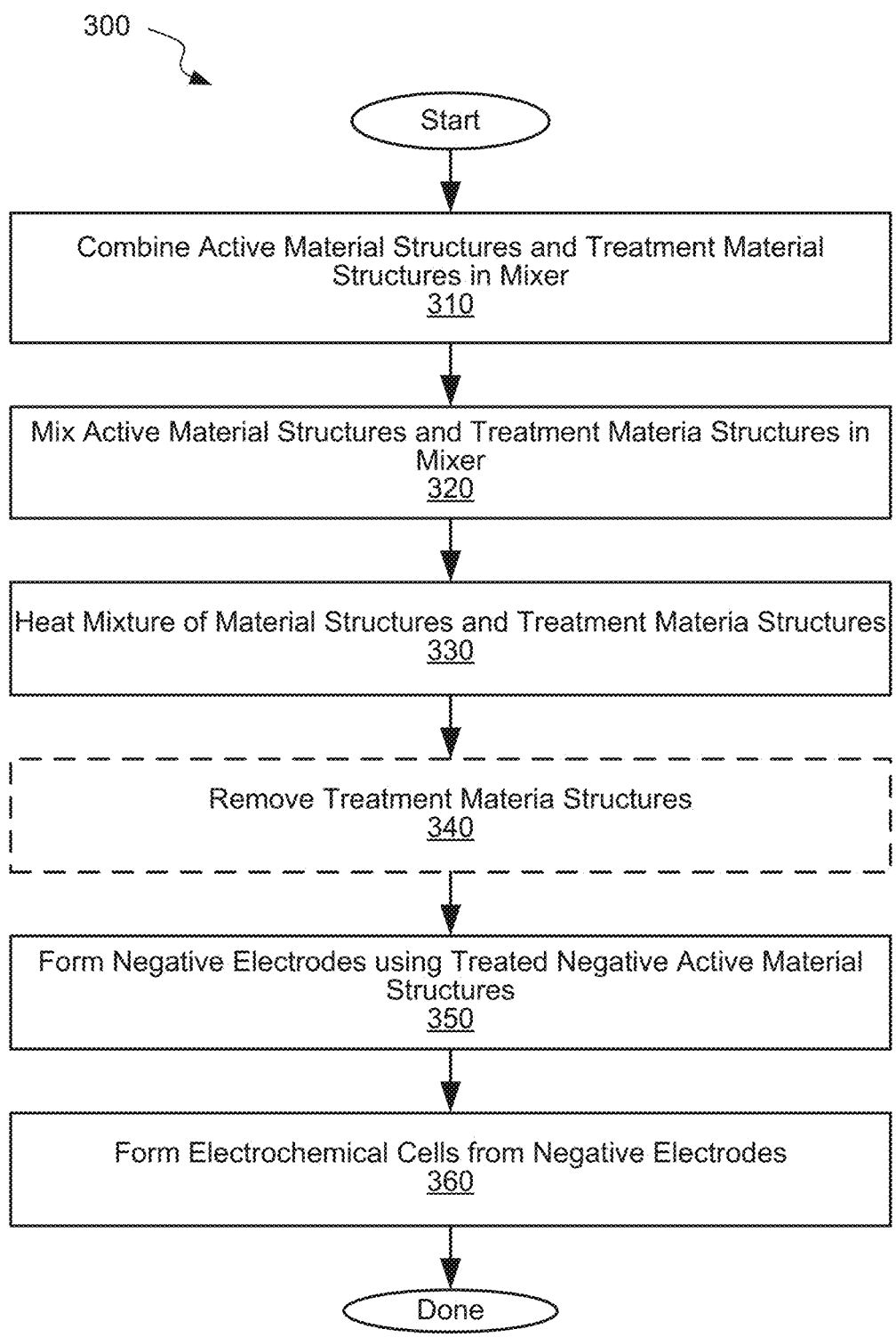
FIG. 3 is a process flowchart corresponding to a method of fabricating treated negative active material structures, negative electrodes comprising these structures, and electrochemical cells comprising these negative electrodes, in accordance with some examples.

FIG. 3 is a process flowchart corresponding to method 300 of fabricating treated negative active material structure 130, negative electrodes 400 comprising these treated negative active material structure 130, and electrochemical cells 450 comprising these negative electrodes 400, in accordance with some examples.

In some examples, method 300 comprises combining active material structures 110 and treatment material structures 120 in a mixer (block 310). Examples of active material structures 110 and treatment material structures 120 are described above. In some examples, the weight ratio of active material structures 110 to treatment material structures 120 is between 0.5 and 5 or, more specifically, between 1 and 3 (e.g., about 2). In general, the ratio of these materials ensures that enough treatment material structures 120 are provided. This amount ensures that enough lithium ions are incorporated into treated negative active material structure 130 before the initial cell charging, e.g., to compensate for expected losses of lithium ions described above. In specific examples, the molar ratio of silicon to lithium in the mixture of active material structures 110 and treatment material structures 120, formed during this operation, is at least 1 or, more specifically, at least 1.5, or even at least 2. The weight ratio depends on the composition of active material structures 110 and treatment material structures 120. Furthermore, an excess of treatment material structures 120 may be provided initially and any unreacted/unconsumed treatment material structures 120 are washed away as further described below.

Method 300 comprises mixing active material structures 110 and treatment material structures 120 in the mixer (block 320). Some examples of suitable mixers include, but are not limited to, a ball mill, a high-sheer blade mixer, and the like. The purpose of this operation is to ensure uniform distribution of active material structures 110 and treatment material structures 120 in the mixture such that active material structures 110 and treatment material structures 120 directly interface each other and can react with each other during later operations (e.g., heating). In some examples, this operation involves changing the size (e.g., reducing the size) of active material structures 110 and/or treatment material structures 120 or at least breaking agglomerates previously formed by active material structures 110 and/or treatment material structures 120.

Method 300 comprises heating the mixture of active material structures 110 and treatment material structures 120 (block 330). For example, the mixture is heated to between about 600° C. and 1200° C., such as between about 800° C. and 1000° C. (e.g., at about 900° C.). The mixture is kept in an inert environment (e.g., comprising nitrogen and, in some examples, hydrogen) during this heating operation. In some examples, the inert environment prevents further oxidation of silicon and ensures the molar balance between Si and $SiO_2$ formed during this heating operation. The specified temperature is maintained for between 10 minutes and 5 hours or, more specifically, between 30 minutes and 2 hours. Without being restricted to any particular theory, it is believed that the reaction between silicon monoxide (provided within active material structures 110) and, for example, lithium hydroxide (provided within treatment material structures 120) is as follows:

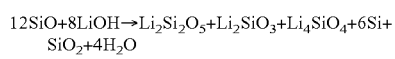

Formula 6

As such, in this example, treated negative active material structures 130, formed during this operation, comprise $Li_2Si_2O_5$, $Li_2SiO_3$, $Li_4SiO_4$, Si, and/or $SiO_2$, while water ($H_2O$) evaporates during heating and removed. As described above, $Li_4SiO_4$ irreversibly traps lithium. It should be noted that $Li_2Si_2O_5$ later releases lithium ions during the delithiation process/first discharging. $Li_2SiO_3$ and $SiO_2$ stay in the negative active material structures as inactive components.

It should be noted that treated negative active material structures 130, formed during this heating operation, are not air-sensitive or moisture-sensitive. As such, negative active material structures 130 can be directly used in solvent-based slurries, e.g., during the fabrication of negative electrodes. Furthermore, unlike conventional prelithiated materials, treated negative active material structures 130 described herein can be stored without a need for a controlled environment (e.g., moisture-free, air-free).

In some examples, method 300 comprises removing residual treatment material structures 120 from treated negative active material structures 130 (block 340), which is an optional operational. As described above, treatment material structures 120 may be provided in excess to ensure that a sufficient amount of lithium is introduced into treated negative active material structures 130. The removal of residual treatment material structures 120 may be performed by washing treated negative active material structures 130 with water or other suitable solvents. The remaining treated negative active material structures 130 are dried, e.g., using heating and/or vacuum. It should be noted that treated negative active material structures 130 may be used in a moisture-free form (e.g., the water content of less than 2% by weight or even less than 0.5% by weight) for subsequent operations.

In some examples, treated negative active material structures 130 are used to form a negative electrode (block 350) and, more specifically, to form an electrochemical cell (block 360) in accordance with processes described below. For example, treated negative active material structures 130 may be mixed into a slurry. In some examples, the slurry also comprises a polymer binder (e.g., polyvinylidene fluoride, styrene butadiene rubber, sodium carboxymethyl cellulose, polyacrylonitrile, and the like) and, optionally, a conductive additive (e.g., graphite, carbon black). In some examples, the slurry also comprises active material structure 110 (that are not treated) in addition to treated negative active material structures 130. The ratio of treated negative active material structures 130 and active material structure 110 in the slurry and subsequently in a negative electrode formed from this slurry depends on the expected first cycle efficiency for active material structure 110 alone.

The slurry is coated (e.g., using a doctor blade) onto a current collector substrate (e.g., a copper foil) and dried, thereby forming an active layer over the current collector substrate. The process may be repeated for the other side of the current collector substrate. In some examples, the coated layers are compacted in a roll-press, e.g., to achieve the desired density and porosity.

A combination of the current collector substrate and one or two active layers (e.g., one on each side of the current collector substrate) forms an electrode, ready to be used in an electrochemical cell. Some examples of such electrodes are described below with reference to FIG. 4A. The electrode can wound or stacked with one or more other electrodes and separators into a structure described below with reference to FIG. 4B. A structure is filled with an electrolyte and sealed at which point, the fabrication of the electrochemical cell is completed.

Examples of Electrode and Electrochemical Cells/Applications

Figure 4A:
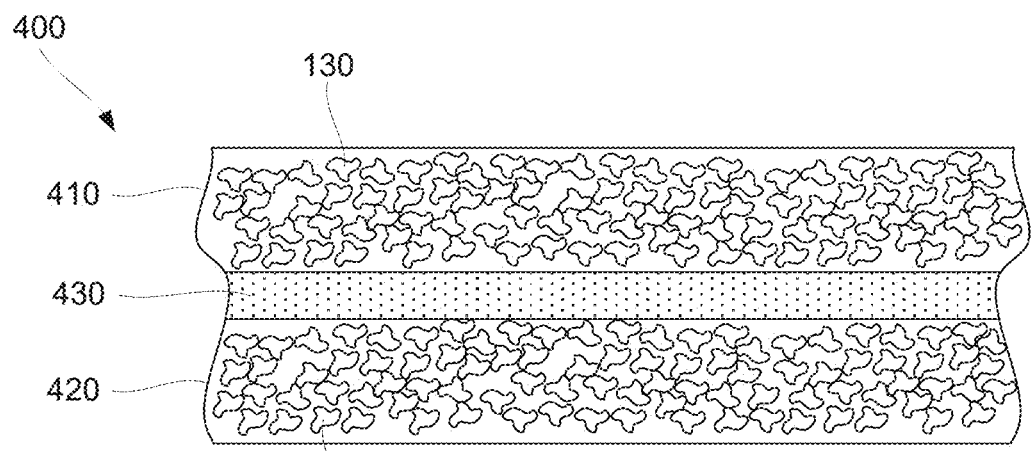
FIG. 4A is a schematic illustration of an electrode, in accordance with some examples.

In some examples, pre-lithiated negative active materials, which are also referred to as treated negative active material structures 130, are used in an electrode or, more specifically, in a negative electrode of an electrochemical cell. FIG. 4A is a schematic illustration of electrode 400, comprising current collector 430, first active layer 410, and, optionally, second active layer 420. In this example, first active layer 410 and second active layer 420 are supported by current collector 430, which also provides electric communication between each of first active layer 410 and second active layer 420 and other components of the cell. More specifically, current collector 430 is positioned between first active layer 410 and second active layer 420 and mechanically bound to each of first active layer 410 and second active layer 420. This binding provides electronic pathways between current collector 430 and each of first active layer 410 and second active layer 420. Various examples of current collector 430 are within the scope, e.g., foils, meshes, foam structures, and the like. Any conductive material that is electrochemically stable at operating potentials of electrode 400 is generally suitable for current collector 430. Some examples include, but are not limited to, copper, stainless steel, titanium, carbon-structures (e.g., graphite foil), and the like.

One or both first active layer 410 and second active layer 420 may comprise treated negative active material structures 130. Treated negative active material structures 130 are configured to receive and release ions during cycling of the electrochemical cell. First active layer 410 and second active layer 420 may comprise a binder, other active materials, and/or other conductive additives in addition to treated negative active material structures 130.

Figure 4B:
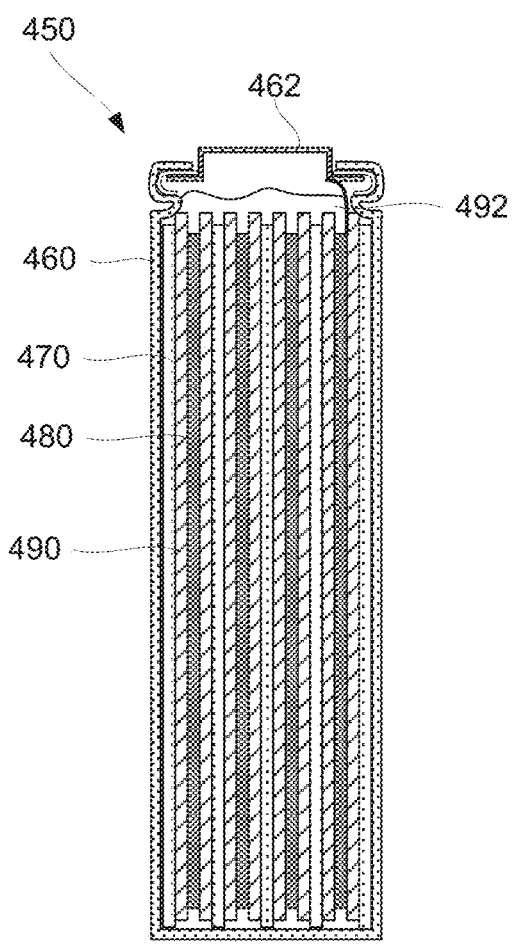
FIG. 4B is a schematic illustration of an electrochemical cell, comprising two electrodes, in accordance with some examples.

FIG. 4B is a schematic illustration of electrochemical cell 450, comprising first electrode 470, second electrode 480, and separator 490 arranged in a stack, wound jelly-roll, or any form. First electrode 470, second electrode 480, or both may include treated negative active material structures 130, as described above with reference to FIG. 4A. Separator 490 is disposed between first electrode 470 and second electrode 480 and prevents direct mechanical and electrical contact between first electrode 470 and second electrode 480. However, separator 490 allows ionic communication between these electrodes. Specifically, separator 490 may include pores allowing ions to pass through during the charge and discharge of electrochemical cell 450. Electrochemical cell 450 also includes electrolyte 492, which operates as a carrier of ions during the charge and discharge. First electrode 470, second electrode 480, and other components of the cell may be enclosed and separated from the environment by case 460 and lid 462. In some examples, case 460 and/or lid 462 may operate as terminals of electrochemical cell 450, in which case current collectors of first electrode 470 and/or second electrode 480 are connected to case 460 and/or lid 462. Some examples of electrochemical cell 450 include, but are not limited to, lithium-ion batteries, lithium-polymer batteries, lithium-air batteries, lithium-sulfite batteries, lithium-metal batteries, solid-state batteries, supercapacitors, and the like.

Experimental Examples

Figure 5:
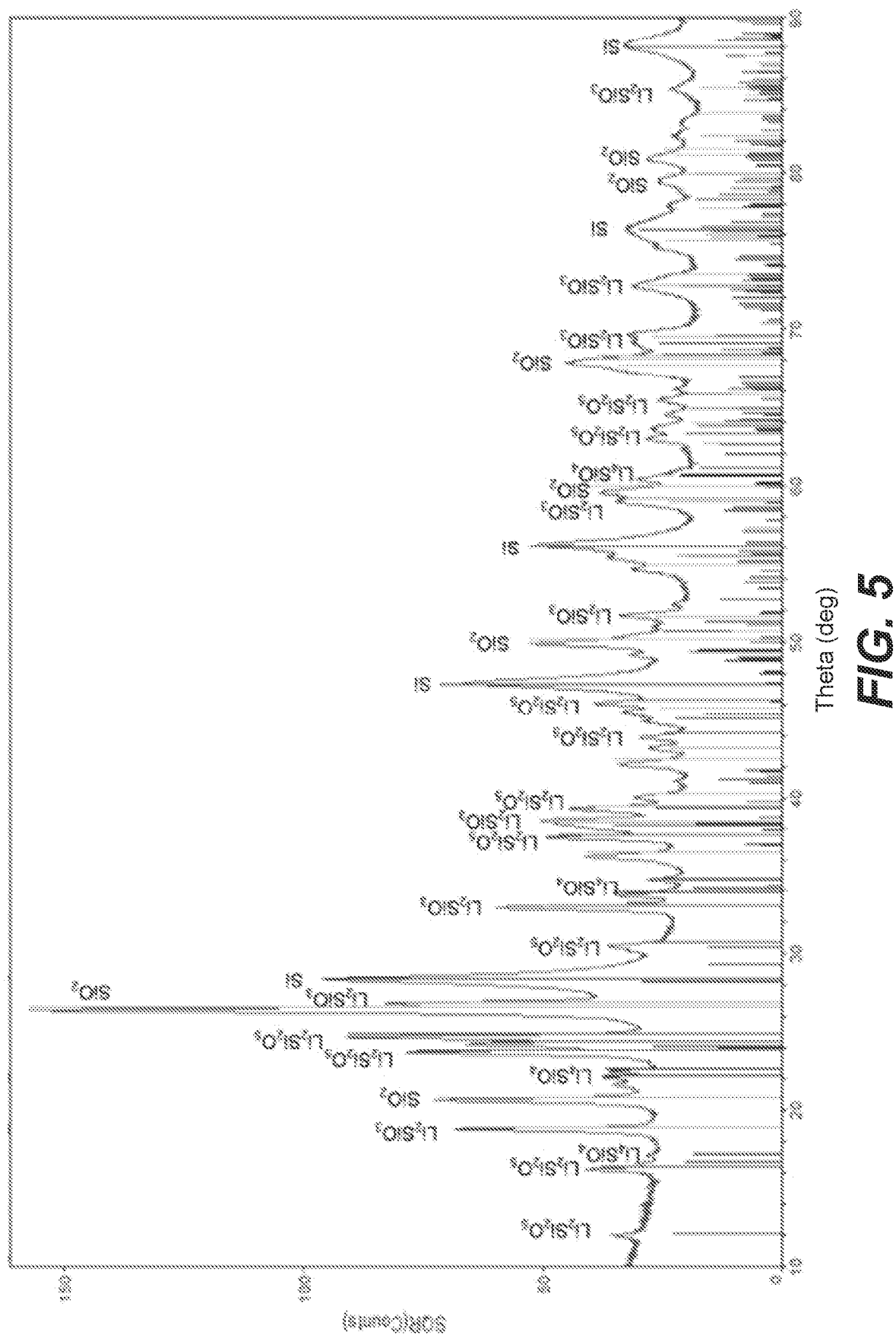
FIG. 5 is an X-ray powder diffraction (XRD) data showing the composition of treated negative active material structures formed by solid state pretreatment of silicon monoxide with lithium hydroxide (LiOH).

Various experiments have been conducted to analyze the reaction between lithium hydroxide with silicon monoxide and the performance of resulting treated negative active material structures. In one experiment, lithium hydroxide (LiOH) and silicon monoxide (SiO) particles were first combined in a ball mill (1:2 of LiOH:SiO by weight) and then annealed at 900° C. in the $N_2/H_2$ environment. As noted above, this inert environment was used to prevent further oxidation of silicon monoxide. The products of this reaction were $Li_2SiO_5$, $Li_2SiO_3$, $Li_4SiO_4$, Si, and SiO, as confirmed by an X-ray powder diffraction (XRD) analysis shown in FIG. 5. These test results correspond to the reaction represented by Formula 6 above. These products may be referred to as pre-lithiated negative active material.

Figure 6:
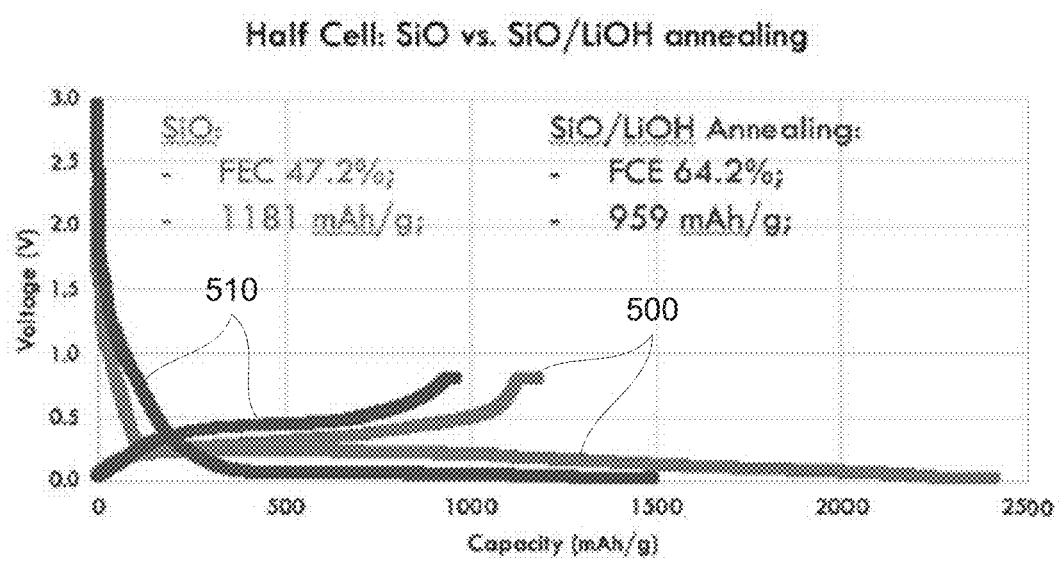
FIG. 6 is a cycling data for a reference electrochemical cell and a cell manufactured with treated negative active material structures.

The pre-lithiated negative active material, produced in the experiment above, was tested in a half-cell. Also, a reference half-cell was used for comparison. The reference half-cell was assembled using silicon monoxide material, which has not been pre-lithiated. The cycling results for both cells are presented in FIG. 6. Specifically, line 500 corresponds to a reference cell, manufactured without any prelithiation of silicon monoxide structures. Line 510 corresponds to a new cell, manufactured without prelithiation of silicon monoxide structures using LiOH. FIG. 6 indicates that the first cycle Coulombic efficiency went from 47.2% to 64.2% as a result of the solid state prelithiation of silicon monoxide structures. Furthermore, the capacity of the pre-lithiated negative active material was over 900 mAh/g. As a reference, a first cycle Coulombic efficiency is defined as a ratio of the second cycle to the first cycle.

It should be noted that the capacity of an electrochemical cell ($C_{CELL}$) depends on the capacity of its negative electrode ($C_{NEG-EL}$) and the capacity of the positive electrode ($C_{POS-EL}$). In a simplified form, this relationship may be expressed by the following formulas:

$$\frac{1}{C_{CELL}} = \frac{1}{C_{NEG-EL}} + \frac{1}{C_{POS-EL}} \qquad \text{Formula 7}$$

$$C_{CELL} = \frac{C_{NEG-EL} \times C_{POS-EL}}{C_{NEG-EL} + C_{POS-EL}} \qquad \text{Formula 8}$$

Currently, the most advanced positive active materials have a capacity of 200 mAh/g. As such, even though the capacity of negative electrode active materials is decreased from 1181 mAh/g to 959 mAh/g (e.g., due to the solid state prelithiation), the overall cell capacity improves by about 13-14% due to the improvement in the first cycle Coulombic efficiency of the cell. The first cycle Coulombic efficiency proportionally affects the cell overall capacity and, in this experimental result, the first cycle Coulombic efficiency has increased by 17%, which was attributed to the solid state prelithiation of silicon monoxide structures.

CONCLUSION

Although the foregoing concepts have been described in some detail for purposes of clarity of understanding, it will be apparent that certain changes and modifications may be practiced within the scope of the appended claims. It should be noted that there are many alternative ways of implementing the processes, systems, and apparatuses. Accordingly, the present examples are to be considered as illustrative and not restrictive.

The invention claimed is:

1. A method of solid state pretreatment of active material structures to form treated negative active material structures for negative electrodes in electrochemical cells, the method comprising:

combining the active material structures and treatment material structures in a mixer,
the active material structures comprising $SiO_X$ such that X is between 0.9 and 1.0, and
the treatment material structures comprising a metal hydroxide or a metal oxide;
mixing the active material structures and the treatment material structures using the mixer thereby forming a mixture and ensuring uniform distribution of the active material structures and the treatment material structures in the mixture; and
heating the mixture of the active material structures and the treatment material structures in an environment comprising nitrogen and hydrogen thereby forming the treated negative active material structures, wherein:
the treated negative active material structures comprise one or more electrochemically active materials and one or more electrochemically inactive materials, and
the one or more electrochemically inactive materials comprise at least $Li_6Si_2O_7$.

2. The method of claim 1, wherein the metal hydroxide or the metal oxide of the treatment material structures comprises lithium.

3. The method of claim 1, wherein the metal hydroxide or the metal oxide of the treatment material structures comprises one of lithium hydroxide (LiOH), lithium oxide ($Li_2O$), or lithium peroxide ($Li_2O_2$).

4. The method of claim 1, wherein the metal hydroxide or the metal oxide of the treatment material structures comprises lithium oxide ($LiO_X$) such that X is between 0.5 and 1.

5. The method of claim 1, wherein the mixture of the active material structures and the treatment material structures is heated to between 800° C. and 1000° C.

6. The method of claim 1, wherein heating of the mixture of the active material structures and the treatment material structures removes water generated by reacting the active material structures and the treatment material structures.

7. The method of claim 1, further comprising separating an unreacted portion of the treatment material structures from the treated negative active material structures.

8. The method of claim 1, wherein a molar ratio of silicon to lithium in a mixture of the active material structures and the treatment material structures is at least 1.5.

9. The method of claim 1, wherein a molar ratio of silicon to lithium in a mixture of the active material structures and the treatment material structures is at least 2.

10. The method of claim 1, wherein mixing the active material structures and the treatment material structures comprises reducing size of the active material structures or the treatment material structures.

11. The method of claim 1, wherein mixing the active material structures and the treatment material structures is performed in a ball mill.

12. The method of claim 1, wherein separating an unreacted portion of the treatment material structures from the treated negative active material structures comprises: washing the treated negative active material structures with water; and drying the treated negative active material structures using a combination of heating and vacuum.

13. The method of claim 1, wherein water content of the treated negative active material structures is less than 2% by weight.

14. The method of claim 1, wherein heating the mixture of the active material structures and the treatment material structures is performed for a period between 30 minutes and 2 hours.

15. The method of claim 1, wherein heating the mixture of the active material structures and the treatment material structures is performed at approximately 900° C.

16. The method of claim 1, further comprising:
combining the treated negative active material structures with a polymer binder and a conductive additive to form a slurry; and
coating the slutty onto a current collector substrate.

17. The method of claim 1, wherein the active material structures are in a form of particles, rods, tubes, or flakes.

18. The method of claim 1, wherein the metal hydroxide or the metal oxide of the treatment material structures comprises lithium oxide ($LiO_X$) such that X is between 0.6 and 9.

19. The method of claim 1, wherein a mean principal dimension of the treatment material structures is between 0.1 micrometers and 20 micrometers.

20. The method of claim 1, wherein a mean principal dimension of the active material structures is between 0.1 micrometers and 20 micrometers.

* * * * *